United States Patent [19]

Richter, Sr.

[11] Patent Number: 4,609,119
[45] Date of Patent: Sep. 2, 1986

[54] RETAINING DEVICE FOR MOUNTING ELECTRICAL UNITS

[75] Inventor: Konrad J. Richter, Sr., Lawrenceville, N.J.

[73] Assignee: Heinemann Electric Company, Lawrenceville, N.J.

[21] Appl. No.: 771,244

[22] Filed: Aug. 28, 1985

[51] Int. Cl.$^4$ .............................................. H02G 3/12
[52] U.S. Cl. ...................................... 220/3.5; 220/3.6; 200/295; 248/DIG. 6
[58] Field of Search .......................... 220/3.5, 3.6, 3.4; 200/295, 296; 248/DIG. 6

[56] References Cited

U.S. PATENT DOCUMENTS

| | | | |
|---|---|---|---|
| 2,446,141 | 7/1948 | Parsons | 200/168 |
| 2,605,374 | 7/1952 | Batcheller | 200/159 |
| 2,703,662 | 3/1955 | Meyer | 220/3.6 |
| 2,769,562 | 11/1956 | Rudolph | 220/3.4 |
| 3,394,909 | 7/1968 | DiPilla | 220/3.6 X |
| 3,453,408 | 7/1969 | Mune | 200/168 |
| 3,706,869 | 12/1972 | Sorenson | 200/295 |
| 3,800,113 | 3/1974 | Sheahan | 200/295 |
| 3,848,764 | 11/1974 | Salg | 220/3.6 |
| 4,159,405 | 6/1979 | Semonchik et al. | 200/296 |
| 4,541,036 | 9/1985 | Landries et al. | 220/3.6 X |

*Primary Examiner*—Steven M. Pollard
*Attorney, Agent, or Firm*—Dann, Dorfman, Herrell and Skillman

[57] ABSTRACT

A retaining device releasably mounts and retains an electrical unit, such as a circuit breaker, within a panel opening. A face plate on the unit overlaps the panel to stop the unit at the panel opening. The retaining device has at least one resilient retaining arm projecting from the unit having a cam surface for engaging an edge of the opening to depress the retaining arm from an original position as the unit is inserted until a retaining surface of the arm passes the edge of the opening and allows the retaining arm to move back toward its original position to hold the panel against the face plate. The retaining device includes a separate lock arm projecting from the unit having a latch element and a latch release. Depression of the lock arm from an original position during insertion of the unit into the opening permits the latch element to clear the edge and pass through the opening. Thereafter, the return of the lock arm toward its original position permits the latch element to abut the panel to prevent withdrawal of the unit from the opening unless the latch release is actuated to depress the lock arm as the unit is withdrawn to permit the latch element to clear the edge and pass back through the opening as the retaining arm resiliently yields against the edge and passes back through the opening.

55 Claims, 19 Drawing Figures

RETAINING DEVICE FOR MOUNTING ELECTRICAL UNITS

FIELD OF THE INVENTION

The present invention relates to a retaining device for releasably retaining a unit within an opening through a panel and, more particularly, to a snap in retaining device, such as a mounting clip, for releasably holding an electrical switch unit, such as a circuit breaker, within an opening through a panel.

BACKGROUND OF THE INVENTION

In certain applications, it is customary to mount electrical units such as electrical switches and circuit breakers on panels. Typically, a circuit breaker will be inserted through an opening in the panel and will be stopped at the panel by a face plate overlapping the panel at the edges of the opening.

To hold the circuit breakers in place, mounting clips secured to the circuit breakers have been utilized to retain the circuit breakers within the panel openings. The mounting clips have been typically secured on opposite sides of the circuit breaker to engage generally opposing edge walls of the panel opening. The conventional clips include resilient arms which yield against the opposing edge walls of the panel opening as the circuit breaker is inserted or withdrawn from the panel opening. The spring force of the resilient retaining arms holds the breaker in position as the arms bear against the opposing edges.

The conventional mounting clip permitted the circuit breaker to be snapped into position simply by pushing the circuit breaker into the panel opening. For removal, the mounting clips also permit the circuit breaker to be snapped out of the panel opening simply by pulling the circuit breaker away from the panel.

In certain circumstances where the panel is subject to excessive or severe vibration or shock, circuit breakers having conventional mounting clips may inadvertently work loose or even work entirely free from the panel opening. In other environments, where the circuit breakers are exposed to work areas, for example, the circuit breakers having conventional mounting clips may be inadvertently jarred from the panel opening during accidental contact or bumping.

In accordance with the present invention, a retaining device is provided which overcomes the problem of the inadvertent disengagement of an electrical unit from panel opening. The retaining device, in accordance with the present invention, securely locks or latches an electrical circuit breaker within a panel opening.

SUMMARY OF THE INVENTION

In accordance with the present invention, a retaining device is provided for releasably retaining within an opening through a panel a unit, such as a circuit breaker, dimensioned to pass through the opening except for a face plate on the unit dimensioned to overlap and engage the panel at the panel opening in order to stop the unit at the panel. The retaining device includes a support portion connected with the unit. The support portion may be an integral part of the unit or it may be separate from the unit and held on the unit.

A resilient retaining arm is connected with the support portion and extends generally in the direction of movement of the unit when the unit is passed through the panel opening. The retaining arm extends from the unit toward the face plate and is formed in sequence by a cam surface diverging from the unit for engaging an edge of the opening and a retaining surface extending generally back toward the unit. During insertion of the unit into the opening, the engagement of the cam surface with the edge of the opening causes the retaining arm to resiliently yield against the edge of the opening and to depress from an original position toward the unit. When the retaining surface moves into engagement with the edge of the opening upon further insertion of the unit into the opening, the retaining arm is allowed to flex back toward its original position away from the unit so that the retaining surface holds the panel against the face plate when the unit is fully inserted.

The retaining device also includes a resilient lock arm coupled with and projecting from the unit proximate the retaining arm. The lock arm is connected with the support portion proximate the retaining arm and extends generally in the direction of movement of the unit and generally parallel to the retaining arm. The lock arm extends from the unit toward the face plate and is formed in sequence by a latch element for abutting the panel at an edge of the opening upon insertion of the unit into the opening and a latch release to permit removal of the unit. During insertion of the unit into the opening, depression of the lock arm from an original position toward the unit permits the latch element to clear the edge and pass through the opening whereupon the return of the lock arm toward its original position away from the unit moves the latch element into position to abut the panel to prevent removal of the unit. The panel is, in effect, retained between the latch element on one side of the panel and the face plate positioned on the other side of the panel.

The unit may only be removed from the opening when the latch release is actuated to depress the lock arm to permit the latch release to clear the edge and pass back through the opening to permit the unit to be withdrawn. Meantime, the retaining surface of the retaining arm resiliently yields against the edge of the opening and also passes back through the opening.

BRIEF DESCRIPTION OF THE DRAWINGS

The foregoing summary, as well as the following detailed description of the preferred embodiments of the present invention, will be better understood when read in conjunction with the accompanying drawings, in which.

DESCRIPTION OF THE PREFERRED EMBODIMENTS

Figure 1:
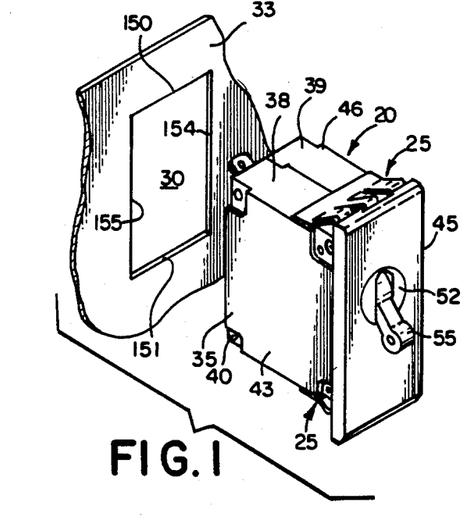
FIG. 1 is a perspective view of a circuit breaker unit having a pair of retaining devices in accordance with the present invention.
Figure 2:
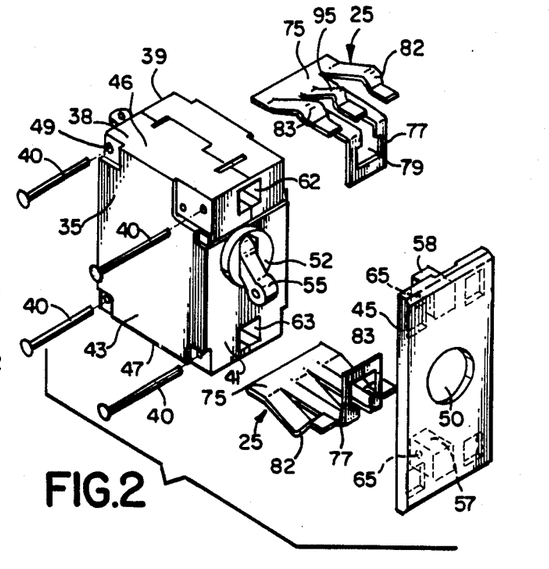
FIG. 2 is an exploded perspective view of the circuit breaker unit depicted in FIG. 1 having retaining devices in accordance with the present invention.
Figure 3:
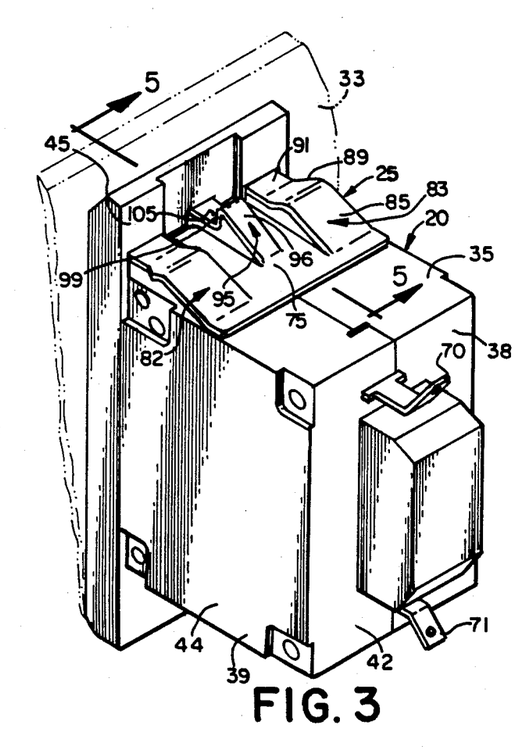
FIG. 3 is a reverse perspective view of a circuit breaker unit having a retaining device in accordance with the present invention mounted within an opening through a panel.

Referring to the drawings and initially FIGS. 1-3, a circuit breaker, generally designated 20, is depicted. The circuit breaker 20 carries a pair of retaining devices 25 in the form of mounting clips for mounting and securing the circuit breaker within an opening 30 through a panel 33, such as a sheet metal panel or cabinet wall.

The circuit breaker includes a generally rectangular solid case 35 formed by two mating half shells 38 and 39. The half shells are held together by rivets 40 which extend through the half shells proximate the four corners of the case as illustrated in FIGS. 1 and 2. The case 35 has a front wall 41 and a back wall 42, generally parallel side walls 43 and 44 and generally parallel end walls 46 and 47.

The circuit breaker 20 includes a face plate 45, preferably molded of an electric insulating material such as a suitable resinous material. The casing 35 of the circuit breaker is dimensioned to pass through the generally rectangular opening 30 in the panel 33 until stopped at the panel by the face plate 45. Sufficient clearance must be provided between opposing edges 150 and 151 of the opening and the end walls 46 and 47 of the casing to permit the retaining clip 25 on each end wall 46 and 47 to engage edges 150 and 151 but still pass through the opening. Edges 154 and 155 of the opening may engage side walls 43 and 44 of the casing 35 in friction fit to prevent lateral movement of the casing in the opening.

To prevent the unit from passing completely through the opening, the face plate 45 is dimensioned larger than the opening and proportioned to overlap the panel 33 around the peripheral edges of the opening 30. In order to stop the breaker at the panel opening, it is not essential for the face plate to overlap the panel completely around the peripheral edges of the opening. Instead, the face plate may comprise several stop members for overlapping the panel. However, a face plate which completely covers the opening is desirable to prevent dust and dirt from entering the opening.

The face plate 45 has a central opening 50 adapted to receive a circular handle boss 52 which projects from the front wall 41 of the casing 35 of the circuit breaker. A switch handle 55 extends from the handle boss 52 and projects outwardly from the face plate opening 50 when the face plate is secured to the front wall 41 of the casing 35 as illustrated in FIG. 1.

As best illustrated in FIG. 2, short mounting lugs 57 and 58 project from the back surface of the face plate 45 near opposite ends of the face plate. The lugs 57 and 58 are dimensioned and aligned to be snugly captured within mating cavities 62 and 63 provided on the front wall 41 of the casing 35. The face plate 45 is secured to the front wall of the case by two of the rivets 40 which are passed through the corners of the casing adjacent front wall 41. These rivets pass through aligned apertures 65 in the respective lugs 57 and 58 to retain the lugs within the cavities 62 and 63 thereby attaching the face plate 45 to the casing 35. As best seen in FIG. 3, external terminals 70 and 71, which project from the back wall of the casing 35, are part of integral conductor strips which pass through slots in the casing 35 and are connected internally of the casing 35 to the operating mechanism of the circuit breaker.

As depicted in FIGS. 1 and 2, the pair of retaining devices 25, in the form of mounting clips, are positioned and engaged with the opposite generally parallel end walls 46 and 47 of the casing 35 proximate to the front wall 41 of the casing and the face plate 45. The pair of mounting clips 25 are substantially uniform in size, shape and dimension and are desirably formed from a single resilient sheet of metal or are molded from a resilient resinous material. In other embodiments, the mounting clips may be formed from more than a single piece of resilient material.

Each clip 25 comprises a reference support portion 75 which engages one of the generally planar support surfaces on end walls 46 and 47 of the circuit breaker casing 35. The clips 25 are held in position on the respective end walls 46 and 47 and are dimensioned to engage and slide along the respective edges 150 and 151 of the panel opening 30 as the breaker is inserted or withdrawn from the opening. To mount the clips on the breaker, each clip 25 has a mounting portion 77 connected with and bent at a right angle relative to the reference support 75 for engaging the generally planar surface on the front wall 41 of the casing against which the face plate 45 is secured. The mounting portion 77 preferably includes a closely conforming opening or aperture 79 through which one of the respective lugs 57 or 58 provided on the back surface of the face plate 45 projects in friction fit to anchor each clip. The mounting portion 77 positions the clip relative to the front wall 41 of the casing.

Each clip also includes a pair of resilient retaining arms 82 and 83 supported by the support portion 75 of the clip 25. The retaining arms are formed from a common piece of sheet metal and are integral at one end with the support portion 75. In other embodiments, the retaining arms may be formed from separate pieces of a resilient material such as sheet material. The retaining arms 82 and 83 are cantilevered extensions of the support portion and extend toward the face plate 45 from the support portion of the clip 25 resting on one of the end walls 46 or 47, as best illustrated in FIG. 3. The retaining arms 82 and 83 extend generally in the direction of movement of the breaker 20 through the panel opening 30. The retaining arms 82 and 83 diverge from the unit and terminate in proximity to face plate 45. The resilient retaining arms 82 and 83 are generally of the same shape and dimension and have longitudinal axes which are oriented generally parallel with one another. Movement of the retaining arms 82 and 83 during insertion and withdrawal of the unit is generally coordinated.

Each retaining arm 82 and 83 is formed from the connection with the support portion 75 of the clip 25 to provide a cam surface 85 sloping away from the plane of the support portion and the underlying generally planar support surface of the respective end walls 46 or 47 of the casing. The cam surface 85 terminates in a shorter reversed sloped cam portion 89 which extends back toward the respective underlying end wall 46 or 47 of the casing. The reverse sloped cam portion 89 slopes back toward the unit at a generally obtuse angle relative to the cam portion 85 and serves as a retaining surface for engaging the panel to hold the face plate 45 flush against the other side of the panel when the unit is fully inserted. The retaining arm terminates in a free end 91 which is joined with cam portion 89 and which is oriented generally parallel to the supporting planar surface on the respective end wall 46 or 47.

Each clip also includes a resilient lock arm 95 which projects from the support portion 75 of the clip, preferably at a position generally intermediate the retaining arms 82 and 83. The lock arm is an integral cantilevered extension of the support portion 75 and has a longitudinal axis oriented generally parallel to the retaining arms 82 and 83. As best illustrated in FIG. 3, the lock arm 95 extends generally in the direction of movement of the breaker 20 into opening 30. The lock arm 95 diverges away from the support portion 75 and the underlying support surface on respective end walls 46 and 47 and terminates proximate the face plate 45 of the circuit breaker.

Figure 5:
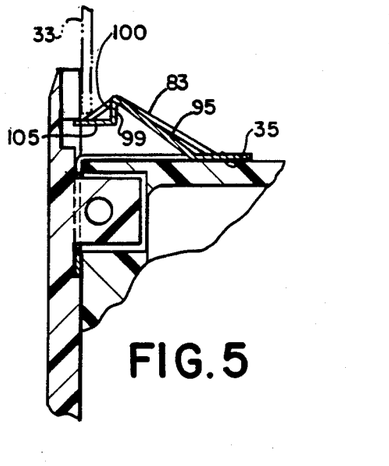
FIG. 5 is a fragmentary sectional view of the circuit breaker unit taken along line 5—5 of FIG. 3.

The lock arm 95 is formed from the point of connection with the support portion 75 by a camming portion 96 sloping away from the underlying support surface of the casing on respective end walls 46 and 47. A latch element in the form of latching shoulder 99 is formed adjacent to the camming portion 96 by forming a bend in the lock arm such that latching shoulder projects back toward the casing and is oriented approximately parallel to the face plate and generally normal to the support surface on respective end walls 46 and 47 of the casing. The shoulder portion 99 projects back toward the support surface on the casing from the camming portion 96 at a generally acute angle relative to the camming portion 96. As best illustrated in FIG. 5, the latching shoulder 99 provides an abutment surface 100 which is oriented generally perpendicular to the underlying generally planar support surface on the respective end walls 46 and 47 of the casing 35. The lock arm 95 terminates in an end portion 105 which serves as a latch release element and which is integral with and projects from the latching shoulder 99 toward the face plate 45 preferably at an angle approaching a right angle relative to the shoulder. As best illustrated in FIG. 5, the free end 105 of the lock arm extends generally parallel to the support surface on the respective end walls 46 and 47 of the casing and terminates in the proximity of the back surface of face plate 45.

Figure 4:
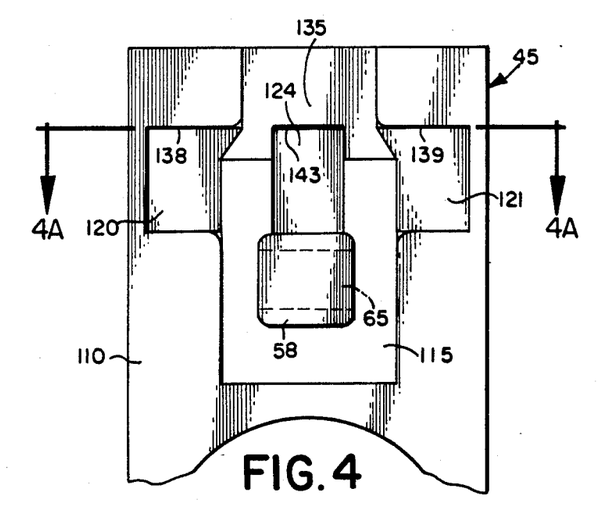
FIG. 4 is a fragmentary elevational view of the back surface of a face plate for the circuit breaker.
Figure 4A:
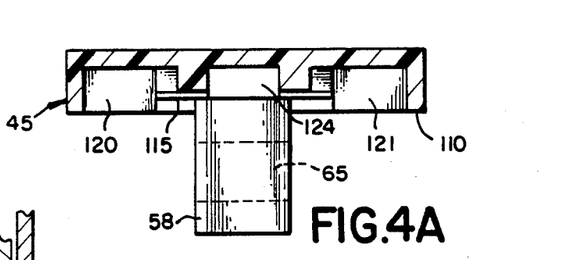
FIG. 4A is a cross sectional view of the face plate taken along line 4A—4A of FIG. 4.

Referring to FIGS. 4, 4A and 5, as previously mentioned, lugs 57 and 58 project outwardly from the back surface of the face plate 45. The back surface of the face plate 45 provides a generally planar surface 110 at least a portion of which abuts the front surface 41 of the casing 35. Surrounding the outer periphery at the base of the lug 58 is a channel 115 which is dimensioned to receive the mounting portion 77 of the clip when the lug 58 is passed through the opening 79 of the mounting portion and the face plate 45 is held in engagement with the front surface 41 of the casing. The channel 115 is recessed from generally planar surface 110 at least sufficiently to accommodate the thickness of the mounting portion 77 of the clip. Guide channels 120 and 121 for retaining arms 82 and 83 are recessed from the planar surface 110 to accommodate and contain the free ends 91 of the respective retaining arms 82 and 83. Another guide channel 124 is located generally intermediate channels 120 and 121 and is recessed from the planar surface 110 to accommodate and contain the free end 105 of the lock arm 95.

The generally planar back surface 110 of the face plate 45 is dimensioned to overlap the panel 33 generally around the periphery of the opening. The back surface 110 abuts the outer surface of the panel 33 when the circuit breaker unit is fully inserted into the panel opening 30. To provide access to the end 105 of the lock arm 95 contained within channel 124 when the face plate 45 is held flush against the panel 33, a slotted access channel 135, as illustrated in FIG. 4, is recessed from back surface 110 of the face plate 45. The channel 135 extends from the outer periphery of the face plate 45 into channel 124 to provide a passageway between the back surface of the face plate and the adjoining outer surface of the panel 33. The access channel 135 enables a tool to be inserted from outside the face plate 45 into channel 124 to depress the end 105 of the lock arm 95 when the breaker is fully inserted into the opening and the back surface of the face plate 45 is held flush against the outside surface of the panel 33.

To assemble the circuit breaker, the mounting portions 77 of the clips 25 are placed over the respective lugs 57 and 58 so that the respective lug passes through the opening 79 in the mounting portion 77 of the clip. The mounting portion 77 is received within the channel 115 on the back surface of the face plate and the channel 115 is sufficiently deep to accommodate the thickness of the mounting portion 77 so that the mounting portion does not protrude above the generally planar back surface 110 of the face plate 45. The lugs 57 and 58 are then inserted into the mating sockets 62 and 63 on the front wall 41 of the casing 35. As the generally planar back surface 110 of the face plate is brought into contact with the front surface 41 of the casing 35, the ends 91 of the retaining arms 82 and 83 and the end 105 of the lock arm 95 must be slightly flexed toward the casing in order to be inserted within the respective guide channels 120, 121 and 124 on the back surface 110 of the face plate 45.

After insertion into the respective guide channels, the ends 91 of the respective retaining arms 82 and 83 resiliently engage and rest against end walls 138 and 139, respectively, of the guide channels 120 and 121. Similarly, the end 105 of the lock arm 95 resiliently engages and rests against the end wall 143 of the guide channel 135.

The lugs 57 and 58 are secured within the respective sockets 62 and 63 by passing the rivets 40 through openings 49 through the casings and through openings 65 in the lugs 57 and 58, thereby trapping the mounting portion 77 of the clip between the front surface 41 of the casing 35 and the back surface of the face plate 45. The ends of the rivets 40 are then peened to secure the face plate 45 and the clips 25 to the circuit breaker casing.

The assembled circuit breaker can be mounted to the panel 33 by inserting the circuit breaker casing 35 into the opening 30 through the panel 33. As illustrated in FIG. 1, the clips 25 are supported against generally parallel surfaces 46 and 47 of the casing so that insertion of the circuit breaker into the opening 30 causes the resilient arms 82, 83 and 95 of the respective clips to engage and yield against generally opposing edges 150 and 151 of the opening. The casing 35 of the circuit breaker is dimensioned to pass through the opening 30 and to provide sufficient clearance to enable the clips 25 to engage the opposing edges 150 and 151.

As the casing is inserted into the opening, the cam portions 85 of the respective retaining arms engage the respective edges 150 and 151, causing the respective retaining arms 82 and 83 to yield against the edges and flex toward the underlying casing. At the same time, the cam portion 96 of the lock arm 95 is similarly deflected. As the forward movement of the casing is continued, the retaining arms and the lock arm continue to flex toward the underlying casing. As the latching shoulder 99 of the lock arm 95 passes by the respective edge of the opening, the spring tension in the lock arm 95 causes the lock arm to spring away from the casing 35 so that the latching shoulder 99 overlaps the edge of the panel and is positioned to abut the back surface of the panel to prevent the breaker from being pulled from the panel opening. As the reverse cam portion 89 of the respective retaining arms passes the respective edge of the opening, some relief of tension in the retaining arms permits the retaining arms to gradually flex away from the unit until the face plate comes into contact with the surface of the panel 33, stopping further movement of the circuit breaker. The spring tension in the retaining arms tends to pull the face plate 45 into flush engagement with the panel 33. The edges 150 and 151 of the panel are then trapped and retained between the overlapping face plate 45 on one side of the panel and the retaining cam portions 89 of the retaining arms on the other side of the panel.

The edge of the panel is also positioned between the overlapping surface of the face plate 45 on one side of the panel and the overlapping shoulder portion 99 of the lock arm 95 on the other side of the panel. As illustrated in FIG. 5, the abutment surface 100 of the shoulder portion 99 is oriented generally parallel with the adjoining generally planar surface of the panel. Depending on the thickness of the panel, there may be some clearance between the shoulder portion 99 of the lock arm 95 and the adjoining surface of the panel, as illustrated in FIG. 5.

Attempted withdrawal of the unit from the panel, by exerting an outward force on the unit generally perpendicular to the plane of the panel, for example by pulling on the handle of the circuit breaker, is not effective to remove the breaker. Such force causes the cam-like retaining portion 89 of the retaining arm to move along the respective edges 150 and 151 of the opening causing the retaining arms 82 and 83 to yield against the respective edges 150 and 151 of the panel. Each retaining arm flexes toward the circuit breaker casing, but withdrawal of the unit is stopped when the abutment surface 100 of the latching shoulder 99 of the lock arm 95 comes in contact with the adjoining surface of the panel. Further withdrawal of the unit is prevented unless the latch release element 105 of the lock arm 95 is depressed toward the casing to permit the overlapping shoulder 100 to clear the edge of the panel and pass back through the opening 30.

Figure 6:
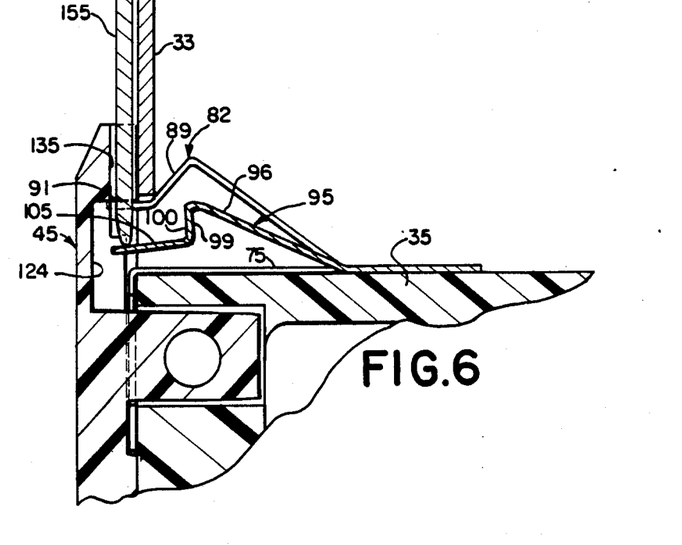
FIG. 6 is a fragmentary sectional view of the circuit breaker unit illustrating the manual depression of a lock arm of the retaining device by a tool to permit removal of the unit from the panel opening.

As illustrated in FIG. 6, the release element 105 of the lock arm 95 is dimensioned to extend at least to the face plate 45 and to protrude outwardly from the panel opening 30. To permit the shoulder 99 to clear through the opening, the release element 105 at the free end of the lock arm is depressed toward the casing. To accomplish such release, a screw driver or other tool 155 may be inserted between the face plate 45 and the panel 33 through the access channel 135. Similarly, access to the release element 105 of the lock arm 95 may be effected by pulling the breaker from the panel to expose the release element 105. Since the thickness of the panel may not always provide sufficient clearance with the shoulder 99 of the lock arm 95 to permit the breaker to be pulled away from the panel, it is desirable to have the access channel 135 between the face plate 45 and the panel to provide access to the latch release element 105 even when the face plate is held flush against the panel. Likewise, it is desirable for the latch release 105 to protrude outwardly from the opening without the need to pull the breaker from the panel to expose the latch release.

To release the latch, the tool 155 is inserted into the access channel 135, as best seen in FIG. 6, so that the tool engages and depresses the release element 105 thereby moving the lock arm 95 toward the casing 35. When the lock arm has been depressed a sufficient distance to permit the shoulder 99 of the lock arm to clear through the opening, the shoulder 99 may be moved past the panel. Accordingly, to remove the unit from the panel, an outward force generally perpendicular to the panel 33 must be applied to the unit to overcome the spring bias of the retaining arms 82 and 83 while a force generally parallel to the panel is applied to the release element 105 of the lock arm 95 to overcome the spring bias of the lock arm to permit shoulder 99 to clear the edge and pass through the opening. When the circuit breaker is withdrawn a sufficient distance to permit the shoulder portion of the lock arm to pass back through the opening 30, the lock arm may be released and the unit completely withdrawn from the panel.

Since the unit has a pair of clips on opposite edges of the casing, the lock arms 95 on each of the clips may both have to be depressed to permit withdrawal of the unit. This may be accomplished by releasing the first lock arm and rocking the unit to release the other lock arm. Alternatively, separate tools may be utilized to simultaneously release both lock arms and pry the unit from the opening.

The latching shoulder 99 of the lock arm 95 provides a positive lock stop which prevents the circuit breaker from falling out or being inadvertly pulled from the panel 33. By providing the latching shoulder on a lock arm 95 separate from the retaining arms 82 and 83, the spring force of four different retaining arms holds the unit in the panel opening 30 while only a single lock arm on each side of the unit must be released to permit removal of the unit. Further, even if the retaining arms of the clip are inadvertently bent prior to insertion, the lock arm will still positively lock the unit in place.

Figure 7:
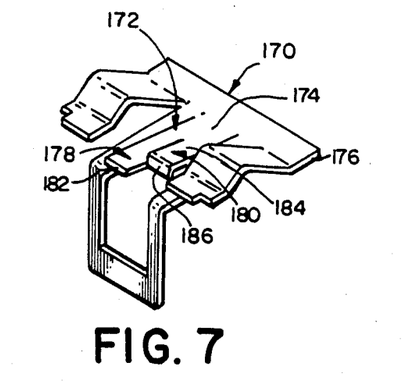
FIG. 7 is a perspective view of another preferred embodiment of the retaining device in accordance with the present invention.

Referring to FIG. 7, a retaining clip 170, in accordance with another embodiment of the present invention, is depicted. The retaining clip 170 is similar to the retaining clip 25 of FIGS. 1-6 previously described but differs in the configuration of the lock arm 172. The lock arm 172 includes a base portion 174 which is integrally connected with and projects from the support portion 176 of the clip so as to diverge away from the casing of the circuit breaker. Separate arm members 178 and 180 are integrally connected with and project from the base portion 174 of the lock arm 172. Arm member 178 diverges away from the casing of the circuit breaker at the same general slope as the base portion 174. Arm member 178 is dimensioned to have an end portion 182 which projects outwardly from the opening 30 of the panel 33 to provide a latch release to permit engagement with the tool means 155 to depress and release the lock arm surface 186 of arm member 180 from the panel. Arm member 180 includes a sloped cam-like portion 184 diverging away from the casing of the breaker to provide a camming surface for engaging and yielding against an edge of the opening 30. As the breaker is inserted into the panel opening 30, the camming portion 184 engages the edge of the opening which causes the lock arm 172 to yield against the edge and flex toward the breaker. The arm member 180 also includes an end portion 186 joined with the sloped portion 184 and configured to project back toward the underlying unit at a generally right angle relative to the sloped cam-like portion 184. The end portion 186 is configured to form a latch shoulder to overlap and abut the panel upon insertion of the breaker into the panel opening.

Figure 8:
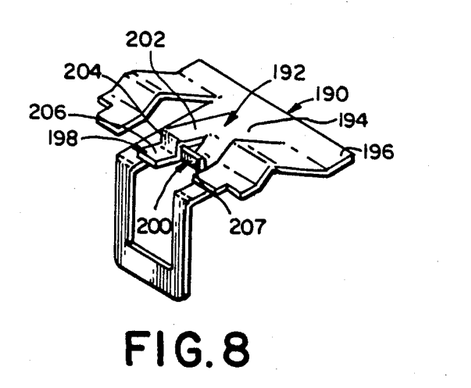
FIG. 8 is a perspective view of another preferred embodiment of the retaining device in accordance with the present invention.

Referring to FIG. 8, a retaining clip 190 is depicted having a lock arm 192 with a configuration in accordance with another embodiment of the present invention. In other respects, clip 190 is similar to the clip previously described and illustrated in FIGS. 1-6. The lock arm 192 includes a base portion 194 which is integrally connected with and projects from the reference portion 196 of the clip 190 so as to diverge away from the casing of the circuit breaker. Separate arm members 198 and 200 are integrally connected with and project outwardly from the base portion 194 of the lock arm. Arm member 198 includes a sloped cam-like portion 202 which slopes away from the circuit breaker to engage and yield against the edge of the opening as the circuit breaker is inserted into the panel opening 30. A stop shoulder portion 204 is joined with the sloped portion 202 and projects from the sloped portion at a generally right angle relative to the sloped portion 202 back toward the underlying circuit breaker. The shoulder portion 204 serves as a latching shoulder for overlapping and engaging the panel when the unit is passed through the opening 30 and stopped at the panel by the face plate 33. An end portion 206 of the arm member 198 is joined with the shoulder portion 204 and is dimensioned to project toward the face plate outwardly from the opening 30 to provide a latch release. The second arm member 200 is configured to have an end portion 207 positioned generally adjacent the shoulder portion 204 of the first member. The end portion 207 is configured to form a stop shoulder for overlapping and engaging the edge of the panel when the unit is passed through the opening and stopped at the panel by the face plate. End portion 207 of arm 200 and the shoulder portion 204 of arm 198 cooperate to serve as a latch to prevent withdrawal of the breaker from the panel opening.

Figure 9:
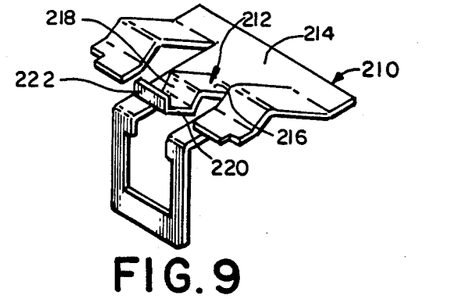
FIG. 9 is a perspective view of another preferred embodiment of the retaining device in accordance with the present invention.

Referring to FIG. 9, a retaining clip 210 having a lock arm 212 configured in accordance with another embodiment of the present invention is depicted. In other respects the clip 210 is similar to the clip previously described and illustrated in FIGS. 1-6. The lock arm 212 is integrally connected with and projects from the support portion 214 of the clip 210. The lock arm is formed in sequence from its point of connection with the support portion 214 by a camming portion 216 which slopes away from the unit to engage and yield against the edge of the panel opening 30 when the unit is inserted into the opening of the panel 33. A shoulder portion 218 is joined with the camming portion 216. The shoulder portion 218 projects from the camming portion 216 back toward the breaker at a generally right angle relative to the camming portion. The shoulder portion 218 is dimensioned to overlap and engage the panel when the unit is passed through the opening and stopped at the panel by the face plate. An edge capturing portion 220 at the end of the lock arm is configured to capture and hold the edge of the panel 33 so that the shoulder portion 218 is positioned on one side of the panel 33 and an end portion 222 of the lock arm is positioned on the other side of the panel 33. The end 222 of the lock arm is configured to project outwardly from the opening to provide a latch release.

Figure 10:
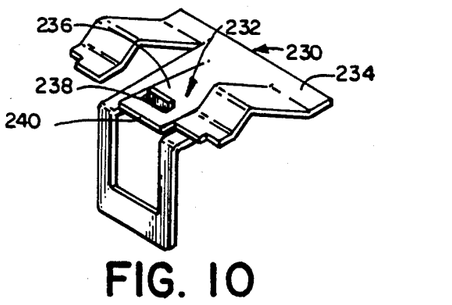
FIG. 10 is a perspective view of another preferred embodiment of the retaining device in accordance with the present invention.

Referring to FIG. 10, a retaining clip 230 having a lock arm 232 in accordance with another embodiment of the invention is depicted. Again, in other respects the clip 230 is similar to the clip previously described and illustrated in FIGS. 1-6. The lock arm 232 is integrally connected with and projects from the support portion 234 of the clip 230. The lock arm 232 includes a sloped camming portion 236 which diverges and slopes away from the circuit breaker. A stop tab 238 is lanced and bent from an intermediate portion of the lock arm 232. The stop tab 238 is bent at a generally right angle relative to the sloped camming portion 236 so as to project in a direction away from the sloped camming portion 236 and the underlying breaker. The stop tab 238 serves as a latch element to retain the breaker in a panel opening. When a circuit breaker unit carrying clips 230 is inserted into a panel opening, the camming portion 236 of the lock arm 232 yields against the edge of the opening, causing the lock arm to flex toward the unit. Further insertion of the unit causes the stop tab 238 to engage the outside surface of the panel preventing further insertion of the unit unless the lock arm is manually depressed to permit the stop tab 238 to clear the edge of the panel and pass through the opening. Alternatively, by orienting the stop tab 238 at a generally obtuse angle relative to the sloped camming portion 236, the stop tab 238 will provide a cam surface which causes the lock arm to depress as the tab passes the edge of the opening. The stop tab 238 will therefore pass into the panel opening without requiring manual depression of the lock arm.

Where manual depression is required, once the stop tab 238 passes through the opening, the free end 240 of the lock arm 232 may be released to permit the lock arm 232 to flex away from the unit so that the edge of the panel 33 is positioned between the face plate 45 on one side of the panel 33 and the stop tab 238 on the other side of the panel 33. The end 240 of the lock arm 232 is dimensioned to project outwardly from the opening to provide a latch release so that the end 240 can be depressed to permit the stop tab 238 to clear the edge of the panel 33 and pass back through the opening 30 upon withdrawal of the unit.

Figure 11:
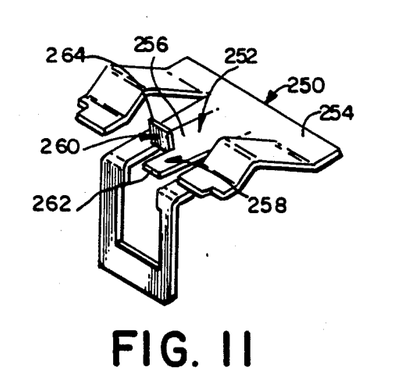
FIG. 11 is a perspective view of another preferred embodiment of the retaining device in accordance with the present invention.

Referring to FIG. 11, a retaining clip 250 having a lock arm 252 in accordance with another embodiment of the present invention is depicted. Once again, clip 250 in other respects, is similar to the clip previously described and illustrated in FIGS. 1–6. The lock arm 252 is integrally connected with and projects from the support portion 254 of the clip 250. The lock arm 252 includes a base portion 256 which is joined with the support portion 254 and which diverges away from the casing of the circuit breaker. Separate arm members 258 and 260 are joined with and project from the base portion 256 of the lock arm 252. Arm member 258 is dimensioned to have a free end 262 which projects from the opening to provide a latch release. The other arm member 260 is configured to have at least a latch portion 264 which projects at an angle from the base portion in a direction away from the casing of the circuit breaker to overlap and engage the panel 33 to provide a latch element. When a unit carrying clips 250 is inserted through the opening 30, the base portion 256 of the lock arm 252 will engage and yield against the edge of the opening causing the lock arm 252 to flex toward the unit until the latch portion 264 of the arm member 260 engages the edge of the panel preventing further insertion of the unit. To permit further insertion, the arm member 258 must be depressed a sufficient distance to permit the latch portion 264 to clear the edge of the opening and pass through the opening. When the latch portion 264 passes through the opening, the lock arm 252 may be released in order to permit the lock arm 252 to flex away from the unit so that the latch portion 264 overlaps the edge of the panel 33 preventing withdrawal of the unit. To withdraw the unit, the end 262 of the arm 258 which serves as a latch release must be depressed a sufficient distance to permit the latch portion 264 of arm member 260 to clear the edge of the panel 33 and pass back through the opening 30.

Figure 12:
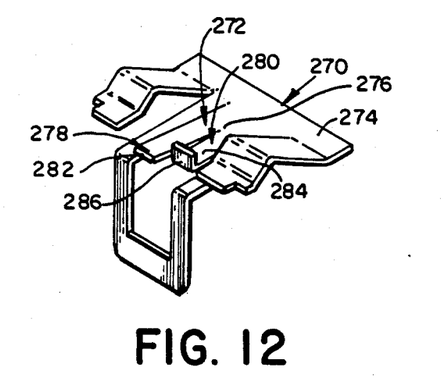
FIG. 12 is a perspective view of another preferred embodiment of the retaining device in accordance with the present invention.

Referring to FIG. 12, a retaining clip 270 having a lock arm 272 in accordance with another embodiment of the present invention is depicted. In other respects, clip 270 is similar to the clip previously described and illustrated in FIGS. 1–6. The lock arm 272 is integrally connected with and projects from the support portion 274 of the clip. The lock arm 272 includes a base portion 276 which is joined with the support portion 274 and diverges away from the casing of the breaker. Separate arm members 278 and 280 are integrally connected with and project from the base portion 276. Arm member 278 is dimensioned to have an end 282 which projects from the opening to provide a lock release. Arm member 280 includes a first portion 284 which is joined with and slopes from the base portion 276 in a direction generally back toward the casing of the circuit breaker. Arm member 280 also includes an end portion 286 joined with and projecting from the first portion 276 in a direction away from the unit to provide a latch element for overlapping and engaging the panel 33 when the unit is inserted into the opening 30. Insertion of the unit causes base portion 276 and arm member 278 to engage and yield against the edge of the opening causing the lock arm 280 to flex toward the unit. Further insertion causes the end portion 286 of lock arm member 280 to engage the edge of the opening to prevent complete insertion of the unit. To permit further insertion, the end 282 of arm member 278 must be depressed to permit the end portion 286 of lock arm member 280 to clear the edge of the panel and pass through the opening whereupon the free end 282 may be released thereby permitting the lock arm 280 to flex away from the unit so that end portion 286 of lock arm 280 overlaps and engages the panel. To remove the unit, end portion 282 of arm member 278 must be depressed a sufficient distance to permit end portion 286 of lock arm member 280 to clear the edge of the panel 33 and pass back through the opening 30.

Figures 13, 14, 15, 16:
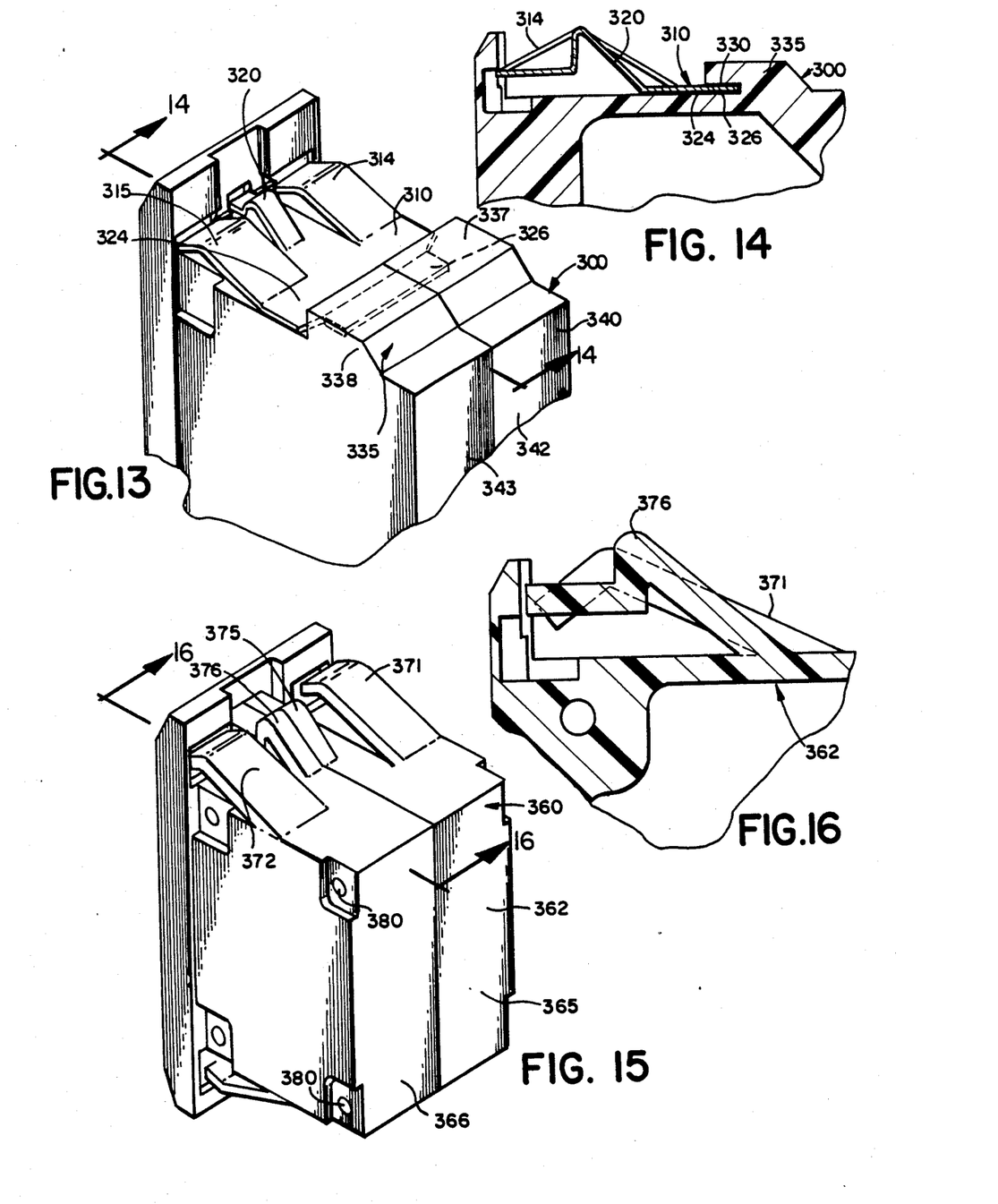
FIG. 13 is a reverse fragmentary perspective view of a circuit breaker unit having a retaining device in accordance with another preferred embodiment of the present invention.
FIG. 14 is a fragmentary sectional view taken along line 14—14 of FIG. 13.
FIG. 15 is a reverse fragmentary perspective view of a circuit breaker unit having a retaining device in accordance with another preferred embodiment of the present invention.
FIG. 16 is a fragmentary sectional view taken along line 16—16 of FIG. 15.

Referring to FIG. 13 and FIG. 14, a circuit breaker unit 300 carrying a retaining clip 310 in accordance with another embodiment of the invention is depicted. The retaining clip 310 includes retaining arms 314 and 315 which are configured substantially similar to the embodiment previously described and illustrated in FIGS. 1–6. Likewise, the lock arm 320 of the retaining clip 310 is configured substantially similar to the embodiment previously described and illustrated in FIGS. 1–6. The major distinction between the clip 310 illustrated in FIGS. 13 and 14 and the retaining clip previously described and illustrated in FIGS. 1–6 is in the configuration of the mounting portion of the clip utilized to retain the clip on the unit. As depicted in FIGS. 13 and 14, the retaining clip 310 includes a support portion 324 which engages a generally planar support surface of the circuit breaker 300. The support portion 324 includes an integral anchor portion 326 which secures the clip to the unit. The anchor portion 326 is dimensioned to be captured and held within a mating anchoring slot 330 in an anchoring portion in the form of a clip holder 335 provided on the circuit breaker unit. As illustrated in FIG. 13, the casing 340 is formed from mating half shells 342 and 343. Mating portions of the anchoring slot 330 are provided on adjoining portions 337 and 338 of the clip holder 335 provided on respective half shells 342 and 343. During assembly, the anchor portion 326 of the clip 310 is inserted into the anchoring slot 330 as the half shells 342 and 343 are mated and then fastened together. When half shell 342 and 343 are fastened together, the clip holder 335 securely holds the anchor portion 326 within the anchoring slot 330. It is desirable for the anchor portion 326 to be captured within the anchoring slot 330 in snug fit to prevent lateral movement of the clip and to hold the clip 310 in position on the circuit breaker unit. Clip designs as shown in FIGS. 7–12 may be varied for use in the embodiment as shown in FIGS. 13 and 14.

Referring to FIGS. 15 and 16, a circuit breaker unit 360 having a casing 362 formed from mating half shells 365 and 366 is depicted. The circuit breaker unit 360 includes retaining arms 371 and 372 similar in function to the embodiment illustrated in FIGS. 1–6 and generally uniform lock arm segments 375 and 376. Retaining arm 371 and lock arm segment 375 are integrally molded with half shell 365 and retaining arm 372 and lock arm segment 376 are integrally molded with half shell 366. The half shells 365 and 366 may be held together to form the casing by inserting rivets in the openings for rivets 380 passing through the casing 362. The lock arm segments 375 and 376 are generally uniform and are supported on adjoining portions of the respective half shells. The lock arm segments are configured to mate with one another when the half shells are fastened together so as to operate as a lock arm unit similar in function to the embodiment illustrated in FIGS. 1–6. The retaining arms 371 and 372 and the lock arm unit comprised of lock arm segments 375 and 376 function in substantially the same manner as the retaining arms and the lock arm of the embodiment described and illustrated in FIGS. 1–6. A minor distinction is that in order to facilitate molding of the unit from a resinous material, the retaining arms and the lock arm segments may be configured so that the ends of the respective arms do not project completely into the receptive guide channels on the back surface of the face plate as seen in FIG. 16. Such a modification in the length of the arms eliminate the function of guide channels in the back of the face plate but otherwise not affect operation of the retaining device. Clip designs as shown in FIGS. 7–12 may be varied for use in the embodiment as shown in FIGS. 15 and 16.

Figures 17, 18:
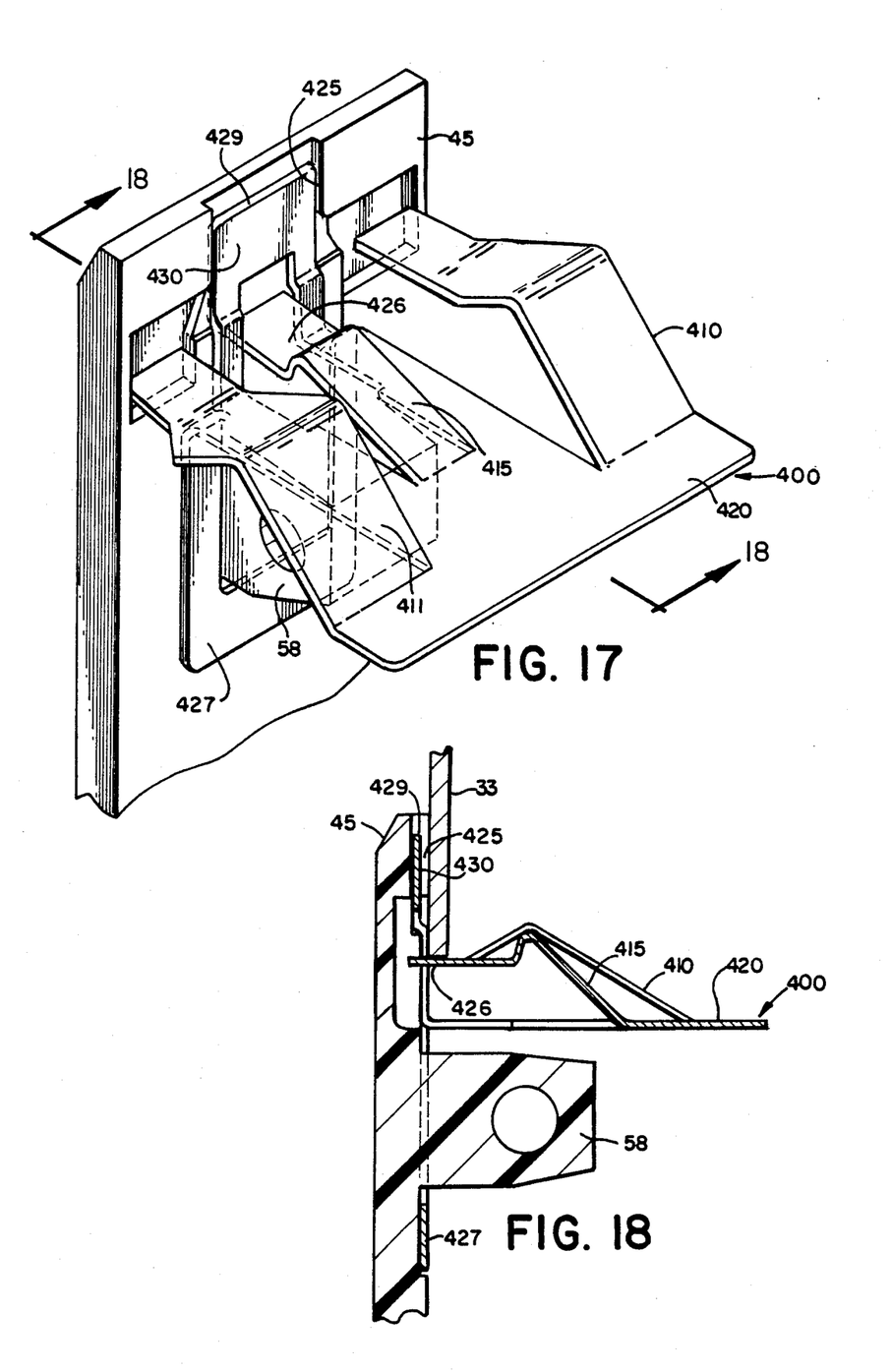
FIG. 17 is a reverse fragmentary perspective view of a circuit breaker unit in accordance with another preferred embodiment of the present invention with the circuit breaker casing and panel removed for purpose of clarity.
FIG. 18 is a fragmentary sectional view taken along line 18—18 of FIG. 17 with the circuit breaker casing removed for purpose of clarity.

Referring to FIGS. 17 and 18, a spring clip 400 in accordance with another preferred embodiment of the present invention is depicted. The retaining clip 400 is substantially similar in function to the embodiment previously described and illustrated in FIGS. 1–6. The retaining clip 400 is again formed of a single piece of sheet metal which may be punched and die formed in several steps. Clip 400 as finished includes retaining arms 410 and 411 and a lock arm 415 connected with and projecting from support portion 420 of the clip. The arms 410, 411 and 415 diverge from the support portion 420 in a direction away from the circuit breaker casing. The clip 400 also includes a mounting portion 427, similar to the embodiment of FIGS. 1–6, through which indexing lug 58 of face plate 45 extends.

The principal difference between retaining clip 400 and the retaining clip 25 previously described and illustrated in FIGS. 1–6 is that the retaining clip 400 includes a face plate protector portion 429 which is cut from the piece of metal providing the mounting portion 427 of the clip having the opening for lug 58 but bent 90° in the opposite direction from the 90° bend of the mounting portion 427 relative to the support portion 420. This face plate protector portion 429 and mounting portion 427 lie in approximately the same plane, or planes which are generally perpendicular to the support portion 420, and engage a back surface of the face plate 45. As best illustrated in FIG. 18, the face plate protector portion 429 is configured to abut the back surface of the face plate 45 along the access channel 425 for the release tool. As previously described, the access channel 425 extends from a peripheral edge of the face plate between the back surface of the face plate 45 and the front surface of panel 33 to the latch release 426 of lock arm 415. Access channel 425 permits insertion of a tool between the face plate and the panel to engage and depress lock arm 415. The protector portion 429 of the clip may be offset toward the face plate 45 to serve as a protective liner for the face plate in the access channel 425 for the tool. The offset is formed by a small double bend in the protector portion. The thickness of the protector portion relative to the channel 425 is dimensioned to provide sufficient clearance in the access channel 425 between the protector portion 429 and the panel 33 to permit insertion of the tool means along the channel between the protector portion and the panel. After the tool is inserted into the access channel 425 and the lock arm 415 is engaged and depressed, the tool may then be pryed against the protector portion 429 to exert an outward force on the unit in order to remove the circuit breaker from the panel opening. The protector portion 429 provides a contact surface 430 for the tool and functions to reduce and relieves stresses on the face plate 45. The protector portion 429 distributes the applied prying forces exerted by the tool away from the face plate 45 and transfers such forces directly to the clip 400. The protector portion 429 also provides additional support to the face plate 45 which permits an increase in the amount of force which can be utilized for prying the circuit breaker unit out of the panel.

It will be recognized by those skilled in the art that changes and modifications may be made without departing from the broad inventive concepts of the invention. It is understood, therefore, that the invention is not limited to the particular embodiments illustrated and described herein, but is intended to cover all changes and modifications which are within the scope and spirit of the invention as set forth in the appended claims.

I claim:

1. A retaining device for retaining a unit within an opening through a panel, the unit being dimensioned to move through the opening and having a face plate on the unit dimensioned to overlap and engage the panel to stop the unit at the panel, the unit ordinarily having a separate retaining device on opposite sides of the unit to retain the unit within the opening, the retaining device comprising:

a. at least one resilient retaining arm connected with the unit extending from the unit toward the face plate and having in sequence a cam surface diverging from the unit for engaging an edge of the opening and a retaining surface extending back toward the unit so that during insertion of the unit into the opening engagement of the cam surface with the edge of the opening causes the retaining arm to resiliently yield against the edge and to depress toward the unit until the retaining surface is moved into engagement with the edge of the opening allowing the retaining arm to move back away from the unit so that the retaining surface holds the panel against the face plate when the unit is fully inserted; and b. a separate resilient lock arm connected with the unit proximate the retaining arm extending generally parallel to the retaining arm toward the face plate, said lock arm diverging from the unit and having in sequence a latch element for abutting the panel at an edge of the opening to latch the unit in position in the panel opening and a latch release to enable release of the latch element to permit removal of the unit so that during insertion of the unit into the opening sufficient depression of the lock arm toward the unit permits the latch element to clear the edge and pass through the opening whereupon the return of the lock arm away from the unit moves the latch element into position to abut the panel to prevent withdrawal of the unit from the opening unless the latch release is actuated as the unit is withdrawn to depress the lock arm to permit the latch element to clear the edge and pass back through the opening.

2. The retaining device in accordance with claim 1 comprising a second retaining arm connected with the unit extending from the unit toward the face plate generally parallel to the lock arm and having in sequence a cam surface diverging from the unit for engaging an edge of the opening and a retaining surface extending back toward the unit so that during insertion of the unit into the opening engagement of the cam surface with the edge of the opening causes the second retaining arm to resiliently yield against the edge and to depress toward the unit until the retaining surface of the second retaining arm is moved into engagement with the edge of the opening allowing the second retaining arm to move back away from the unit so that the retaining surface of the second retaining arm holds the panel against the face plate when the unit is fully inserted.

3. The retaining device in accordance with claim 2 wherein the first and second retaining arms are generally uniform in shape and dimension, have respective longitudinal axes oriented generally parallel with one another, and are positioned on the unit relative to one another so that the movement of each retaining arm is generally coordinated with the movement of the other retaining arm during insertion and withdrawal of the unit.

4. The retaining device in accordance with claim 3 wherein said resilient lock arm has a longitudinal axis and is positioned on the unit generally intermediate the first and second retaining arms with the longitudinal axis of the lock arm oriented generally parallel with the longitudinal axes of the retaining arms.

5. The retaining device in accordance with claim 1 wherein said unit comprises a case and the lock arm and the retaining arm are integrally connected with the case.

6. The retaining device in accordance with claim 5 wherein said lock arm and said retaining arm are integrally molded to the case.

7. The retaining device in accordance with claim 1 comprising a second retaining arm generally uniform to the other retaining arm and second lock arm generally uniform to the other lock arm and wherein said unit comprises a case having two mating half shells and attachment means for holding the two half shells together to form said case and wherein the two half shells include adjoining surfaces when held together by the attachment means and each adjoining surface supports one of the retaining arms and one of the lock arms.

8. The retaining device in accordance with claim 7 wherein the lock arms are positioned on the respective adjoining surfaces of the half shells so that lock arms adjoin and mate with one another to form and function as a single lock arm unit when the two half shells of the case are held together by the attachment means.

9. The retaining device in accordance with claim 1 wherein said retaining device includes a mounting clip separate from and mountable on the unit having a support portion for engaging a mating surface of the unit and mounting means connected with the support portion for holding the clip on the unit, said lock arm and said retaining arm projecting from the support portion of the clip.

10. The retaining device in accordance with claim 9 wherein said unit includes a case and the face plate is separate, from the case, said face plate having at least one lug and said case having a mating cavity for capturing said lug and means for retaining said lug in said cavity to hold said face plate on the case, and wherein said mounting means of said clip includes a mounting portion connected with the support portion having an aperture through which said lug snugly fits so that said mounting portion is held snugly in position between said face plate and said casing to hold the clip in position on said unit.

11. The retaining device in accordance with claim 9 wherein the mounting means of said clip comprises an anchor portion integral with the support portion of the clip and wherein said unit includes an anchoring member providing a mating anchoring slot for capturing and holding the anchor portion of the retaining means in position to hold the clip on said unit.

12. The retaining device in accordance with claim 11 wherein said unit comprises a casing having mating half shells, each half shell respectively providing a mating section of said anchoring member and said anchoring slot on adjoining surfaces of the respective half shells, and means for holding the half shells together upon insertion of the anchor portion of the clip into the anchoring slot to retain the anchor portion of the clip within the anchoring slot.

13. The retaining device in accordance with claim 9 wherein said unit includes a case and wherein the face plate is coupled with said case and is dimensioned to overlap said panel generally around the periphery of the opening to engage one side of the panel to stop said unit at said panel, said face plate configured to provide a passageway to said latch release between said panel and said face plate to permit insertion of tool means therethrough to actuate said latch release to depress the lock arm and release the latch element when said unit is fully inserted into the opening and stopped at the panel by said face plate.

14. The retaining device in accordance with claim 13 wherein said clip includes a protective liner portion connected with said support portion of the clip for engaging and lining at least a portion of the face plate in said passageway, the protective liner portion being dimensioned to provide sufficient clearance in the passageway to permit insertion of said tool means through the passageway between the protective liner portion of the clip and the panel to provide a protective contact surface for the tool means to distribute forces away from the face plate and to relieve stresses on the face plate.

15. The retaining device in accordance with claim 1 wherein said unit comprises two separate retaining devices disposed on the unit in position to respectively engage generally opposing edges of the opening through the panel.

16. A retaining device for retaining a unit within an opening through a panel, the unit being dimensioned to move through the opening and having a face plate on the unit dimensioned to overlap and engage the panel to stop the unit at the panel, the unit ordinarily having a separate retaining device on opposite sides of the unit to retain the unit within the opening, the retaining device comprising:

a. at least one resilient retaining arm connected with the unit extending from the unit toward the face plate and having in sequence a cam surface diverging from the unit for engaging an edge of the opening and a retaining surface extending back toward the unit so that during insertion of the unit into the opening engagement of the cam surface with the edge of the opening causes the retaining arm to resiliently yield against the edge and to depress toward the unit until the retaining surface is moved into engagement with the edge of the opening allowing the retaining arm to move back away from the unit so that the retaining surface holds the panel against the face plate when the unit is fully inserted; and b. a separate resilient lock arm connected with the unit proximate the retaining arm, said lock arm extending from the unit toward the face plate generally parallel to the retaining arm and having in sequence a camming surface diverging from the unit for engaging an edge of the opening, a latch element for abutting the panel at the edge of the opening to latch the unit in position in the panel opening, and a latch release to enable release of the latch element to permit removal of the unit so that during insertion of the unit into the opening engagement of the camming surface of the lock arm with the edge causes the lock arm to resiliently yield against the edge and to depress toward the unit until the latch element clears the edge and passes through the opening whereupon the lock arm returns back away from the unit so that the latch element is positioned to abut the panel to prevent withdrawal of the unit from the opening unless the latch release is actuated as the unit is withdrawn to depress the lock arm to permit the latch element to clear the edge and pass back through the opening.

17. The retaining device in accordance with claim 16 comprising a second retaining arm connected with the unit extending from the unit toward the face plate generally parallel to the lock arm and having in sequence a cam surface diverging from the unit for engaging an edge of the opening and a retaining surface extending back toward the unit so that during insertion of the unit into the opening engagement of the cam surface with the edge of the opening causes the second retaining arm to resiliently yield against the edge and to depress toward the unit until the retaining surface of the second retaining arm is moved into engagement with the edge of the opening allowing the second retaining arm to move back away from the unit so that the retaining surface of the second retaining arm holds the panel against the face plate when the unit is fully inserted.

18. The retaining device in accordance with claim 17 wherein the first and second retaining arms are generally uniform in shape and dimension, have respective longitudinal axes oriented generally parallel with one another, and are positioned on the unit relative to one another so that the movement of each retaining arm is generally coordinated with the movement of the other retaining arm during insertion and withdrawal of the unit.

19. The retaining device in accordance with claim 18 wherein said resilient lock arm has a longitudinal axis and is positioned on the unit generally intermediate the first and second retaining arms with the longitudinal axis of the lock arm oriented generally parallel with the longitudinal axes of the retaining arms.

20. The retaining device in accordance with claim 16 wherein said lock arm is coupled with the unit at one end and is formed in sequence from its point of coupling with said unit by said camming surface sloping away from said unit to engage the edge of the opening as the unit is inserted into the opening, said latch element comprising a stop shoulder connected with the camming surface and configured to project back toward said unit for overlapping and abutting the panel when the stop shoulder is moved past the edge of the opening as said unit is passed through the opening and stopped at the panel by said face plate, and said latch release comprising an end of the lock arm connected with the stop shoulder and configured to project outwardly from said opening when said unit is inserted into the opening and stopped at said panel by said face plate.

21. The retaining device in accordance with claim 20 wherein the stop shoulder includes an abutment surface oriented generally parallel with the panel and dimensioned and positioned to overlap and engage the panel when the unit is inserted into the opening and stopped at the panel by said face plate.

22. The retaining device in accordance with claim 21 wherein said retaining arm is coupled at one end with said unit and is formed in sequence from its point of coupling with said unit by said cam surface sloping away from the unit and said retaining surface connected with said cam surface sloping back toward the unit at a generally obtuse angle relative to the cam surface.

23. The retaining device in accordance with claim 16 wherein said lock arm includes a base portion connected and diverging from the unit and first and second members separated from one another projecting from the base portion, the first member having an end portion dimensioned to project from the opening and the other member having a sloped portion diverging away from said unit to engage and yield against the edge of the opening as the unit is inserted into the opening and a stop shoulder connected with the sloped portion projecting back toward the unit in position for overlapping and engaging the panel when the stop shoulder is moved past the edge of the opening as the unit is passed through the opening and stopped at the panel by the face plate, and wherein said latch release comprises the end portion of the first member, said camming surface comprises said sloped portion of the second member and said latch element comprises the stop shoulder of the second member.

24. The retaining device in accordance with claim 16 wherein said lock arm includes a base portion connected with and diverging from the unit and first and second members separated from one another projecting from the base portion, the first member having a sloped portion diverging away from said unit to engage and yield against the edge of the opening as the unit is inserted into the opening, a stop shoulder connected with the sloped portion projecting back toward said unit in position for overlapping and engaging the panel when the stop shoulder is moved past the edge of the opening as said unit is passed through the opening and stopped at the panel by said face plate, and an end portion connected with said stop shoulder and dimensioned to project outwardly from said opening and the second member having a portion positioned generally adjacent the stop shoulder of the first member configured to provide a second stop shoulder for overlapping and engaging the panel when the second stop shoulder is moved past the edge of the opening as the unit is passed through the opening and stopped at the panel by said face plate and wherein said latch release comprises the end portion of the first member, the camming surface comprises said sloped portion of the first member and said latch element comprises said respective stop shoulders of said first and second members.

25. The retaining device in accordance with claim 16 wherein said lock arm is connected with the unit at one end and is formed in sequence by said camming surface diverging away from said unit to engage and yield against the edge of the opening as the unit is inserted into the opening, said latch element comprising a stop shoulder connected with said camming surface projecting back toward said unit in position for overlapping and engaging the panel when said stop shoulder is moved past the edge of the opening as said unit is passed through the opening and stopped at the panel by said face plate, and said latch release comprising an end of the lock arm connected with the stop shoulder and configured to project from the opening, said lock arm having an end portion configured to capture and hold the edge of the panel between the stop shoulder on one side of the panel and the end of the lock arm on the other side of the panel.

26. The retaining device in accordance with claim 25 wherein said lock arm and said retaining arm are integrally molded to the case.

27. The retaining device in accordance with claim 16 wherein said unit comprises a case and the lock arm and the retaining arm are integrally connected with the case.

28. The retaining device in accordance with claim 16 comprising a second retaining arm generally uniform to the other retaining arm and second lock arm generally uniform to the other lock arm and wherein said unit comprises a case having two mating half shells and attachment means for holding the two half shells together to form said case and wherein the two half shells include adjoining surfaces when held together by the attachment means and each adjoining surface supports one of the retaining arms and one of the lock arms.

29. The retaining device in accordance with claim 28 wherein the lock arms are positioned on the respective adjoining surfaces of the half shell so that the lock arms adjoin and mate with one another to form a single lock arm unit when the two half shells of the case are held together by the attachment means.

30. The retaining device in accordance with claim 16 wherein said retaining device includes a mounting clip separate from and mountable on the unit having a support portion for engaging a mating surface of the unit and mounting means connected with the support portion for holding the clip on the unit, said lock arm and said retaining arm projecting from the support portion of the clip.

31. The retaining device in accordance with claim 30 wherein said unit includes a case and the face plate is separate from the case, said face plate having at least one lug and said case having a mating cavity for capturing said lug and means for retaining said lug in said cavity to hold said face plate on the case, and wherein said mounting means of said clip includes a mounting portion connected with the support portion having an aperture through which said lug snugly fits so that said mounting portion is held snugly in position between said face plate and said casing to hold the clip in position on said unit.

32. The retaining device in accordance with claim 30 wherein the mounting means of said clip comprises an anchor portion integral with the support portion of the clip and wherein said unit includes an anchoring member providing a mating anchoring slot for capturing and holding the anchor portion of the retaining means in position to hold the clip on said unit.

33. The retaining device in accordance with claim 32 wherein said unit comprises a casing having mating half shells, each half shell respectively providing a mating section of said anchoring member and said anchoring slot on adjoining surfaces of the respective half shells, and means for holding the half shells together upon insertion of the anchor portion of the clip into the anchoring slot to retain the anchor portion of the clip within the anchoring slot.

34. The retaining device in accordance with claim 30 wherein said unit includes a case and wherein the face plate is coupled with said case and is dimensioned to overlap said panel generally around the periphery of the opening to engage one side of the panel to stop said unit at said panel, said face plate configured to provide a passageway to said latch release between said panel and said face plate to permit insertion of tool means therethrough to actuate said latch release to depress the lock arm and release the latch element when said unit is fully inserted into the opening and stopped at the panel by said face plate.

35. The retaining device in accordance with claim 34 wherein said clip includes a protective liner portion connected with said support portion of the clip for engaging and lining at least a portion of the face plate in said passageway, the protective liner portion being dimensioned to provide sufficient clearance in the passageway to permit insertion of said tool means through the passageway between the protective liner portion of the clip and the panel to provide a protective contact surface for the tool means to distribute forces away from the face plate and to relieve stresses on the face plate.

36. The retaining device in accordance with claim 16 wherein said unit comprises two separate retaining devices disposed on the unit in position to respectively engage generally opposing edges of the opening through the panel.

37. A retaining device for retaining a unit within an opening through a panel, the unit being dimensioned to move through the opening and having a face plate on the unit dimensioned to overlap and engage the panel to stop the unit at the panel, the unit ordinarily having a separate retaining device on opposite sides of the unit to retain the unit within the opening, the retaining device comprising:

a. at least one resilient retaining arm connected with the unit extending from the unit toward the face plate and having in sequence a cam surface diverging from the unit for engaging an edge of the opening and a retaining surface extending back toward the unit so that during insertion of the unit into the opening engagement of the cam surface with the edge of the opening causes the retaining arm to resiliently yield against the edge and to depress toward the unit until the retaining surface is moved into engagement with the edge of the opening allowing the retaining arm to move back away from the unit so that the retaining surface holds the panel against the face plate when the unit is fully inserted; and b. a separate resilient lock arm connected with the unit proximate the retaining arm generally parallel to the retaining arm toward the face plate, said lock arm diverging from the unit and having in sequence a latch element for abutting the panel at an edge of the opening to latch the unit in position in the panel opening and a latch release to enable release of the latch element to permit removal of the unit so that during insertion of the unit into the opening the latch element moves into engagement with the panel at the edge of the opening preventing further insertion of the unit until the lock arm is depressed toward the unit to permit the latch element to clear the edge and pass through the opening whereupon release of the lock arm causes the lock arm to return back away from the unit so that the latch element is positioned to abut the panel to prevent withdrawal of the unit from the opening unless the latch release is actuated as the unit is withdrawn to depress the lock arm toward the unit to permit the latch element to clear the edge and pass back through the opening.

38. The retaining device in accordance with claim 37 comprising a second retaining arm connected with the unit extending from the unit toward the face plate generally parallel to the lock arm and having in sequence a cam surface diverging from the unit for engaging an edge of the opening and a retaining surface extending back toward the unit so that during insertion of the unit into the opening engagement of the cam surface with the edge of the opening causes the second retaining arm to resiliently yield against the edge and to depress toward the unit until the retaining surface of the second retaining arm is moved into engagement with the edge of the opening allowing the second retaining arm to move back away from the unit so that the retaining surface of the second retaining arm holds the panel against the face plate when the unit is fully inserted.

39. The retaining device in accordance with claim 38 wherein the first and second retaining arms are generally uniform in shape and dimension, have respective longitudinal axes oriented generally parallel with one another, and are positioned on the unit relative to one another so that the movement of each retaining arm is generally coordinated with the movement of the other retaining arm during insertion and withdrawal of the unit.

40. The retaining device in accordance with claim 39 wherein said resilient lock arm has a longitudinal axis and is positioned on the unit generally intermediate the first and second retaining arms with the longitudinal axis of the lock arm oriented generally parallel with the longitudinal axes of the retaining arms.

41. The retaining device in accordance with claim 37 wherein said lock arm is connected with the unit at one end and includes a sloped portion diverging away from said unit and an end portion dimensioned to project from the opening and wherein said latch element includes a stop tab connected with the sloped portion, said stop tab projecting away from said sloped portion and away from said unit for overlapping and engaging the panel and said latch release comprises the end portion of the lock arm.

42. The retaining device in accordance with claim 41 wherein said stop tab projects from the sloped portion of the lock arm proximate the end portion of the lock arm.

43. The retaining device in accordance with claim 42 wherein said lock arm comprises a sheet-like material and said stop tab is lanced from the lock arm and bent at an angle relative to the sloped portion of the lock arm so as to project away from said unit.

44. The retaining device in accordance with claim 37 wherein said lock arm includes a base portion connected with and diverging away from the unit and first and second members separated from one another projecting from the base portion, the first member having an end portion dimensioned to project from the opening and the second member having at least an end portion configured to project at an angle from the base portion in a direction away from the unit to overlap and engage said panel when said end portion of the second member is moved past the edge of the opening as the unit is passed through the opening and stopped at the panel by said face plate, and wherein said lock release comprises said end portion of the first member and said latch element includes said end portion of the second member.

45. The retaining device in accordance with claim 44 wherein said second member projects at an angle from the base portion in a direction away from said unit to provide a stop shoulder and wherein said latch element includes said second member.

46. The retaining device in accordance with claim 37 wherein said lock arm includes a base portion connected with and diverging from said unit and first and second members separated from one another projecting from the base portion, the first member having an end portion dimensioned to project from the opening and the second member having a sloped portion extending generally back toward said unit and an end portion connected with said sloped portion projecting in a direction away from the unit to overlap and engage the panel when the end of the second member is moved past the edge of the opening as the unit is passed through the opening and stopped at the panel by the face plate, and wherein said latch release comprises the end portion of the first member and the latch element comprises the end portion of the second member.

47. The retaining device in accordance with claim 37 wherein said unit comprises a case and the lock arm and the retaining arm are integrally connected with the case.

48. The retaining device in accordance with claim 47 wherein said lock arm and said retaining arm are integrally molded to the case.

49. The retaining device in accordance with claim 37 wherein said retaining device includes a mounting clip separate from and mountable on the unit having a support portion for engaging a mating surface of the unit and mounting means connected with the support portion for holding the clip on the unit, said lock arm and said retaining arm projecting from the support portion of the clip.

50. The retaining device in accordance with claim 49 wherein said unit includes a case and the face plate is separate from the case, said face plate having at least one lug and said case having a mating cavity for capturing said lug and means for retaining said lug in said cavity to hold said face plate on the case, and wherein said mounting means of said clip includes a mounting portion connected with the support portion having an aperture through which said lug snugly fits so that said mounting portion is held snugly in position between said face plate and said casing to hold the clip in position on said unit.

51. The retaining device in accordance with claim 49 wherein said unit includes a case and wherein the face plate is coupled with said case and is dimensioned to overlap said panel generally around the periphery of the opening to engage one side of the panel to stop said unit at said panel, said face plate configured to provide a passageway to said latch release between said panel and said face plate to permit insertion of tool means therethrough to actuate said latch release to depress the lock arm and release the latch element when said unit is fully inserted into the opening and stopped at the panel by said face plate.

52. The retaining device in accordance with claim 37 wherein said unit comprises two separate retaining devices disposed on the unit in position to respectively engage generally opposing edges of the opening through the panel.

53. A retaining clip for retaining a unit within an opening through a panel, the unit having a casing dimensioned to move through the opening and a face plate on the casing dimensioned to overlap and engage the panel to stop the unit at the panel opening, the casing having support surfaces for supporting a pair of retaining clips in position to respectively engage generally opposing edges of the opening, each clip formed from a single piece of resilient sheet material comprising:

(a) a support portion providing a surface for resting against one of the support surfaces of the casing;

(b) a mounting portion connected with the support portion for holding the clip on the unit;

(c) at least one resilient retaining arm connected with and supported by the support portion, the retaining arm extending from the support portion toward the face plate and having in sequence a cam surface diverging away from the support surface of the casing for engaging an edge of the opening and a retaining surface sloping back toward the support surface so that during insertion of the unit into the opening the cam surface engages an edge of the opening causing the retaining arm to resiliently yield against the edge and to depress toward the support surface until the retaining surface is moved into engagement with the edge of the opening allowing the retaining arm to move back away from the support surface so that the retaining surface holds the panel against the face plate when the unit is fully inserted; and (d) a separate resilient lock arm connected with the support portion proximate the retaining arm, the lock arm extending from the support portion toward the face plate generally parallel to the retaining arm, the lock arm having in sequence a camming surface diverging from the support surface for engaging an edge of the opening, a latch shoulder diverging from the camming surface back toward the support surface for abutting the panel at the edge of the opening to latch the unit in position in the panel opening, and a latch release comprising an end portion of the lock arm projecting from the latch shoulder in position to permit depression of the lock arm toward the support surface to release the latch shoulder from the panel so that during insertion of the unit into the opening the camming surface engages an edge of the opening causing the lock arm to depress toward the support surface until the latch shoulder is moved past the edge of the opening whereupon the lock arm flexes back away from the support surface and moves the latch shoulder into position to abut the panel to prevent withdrawal of the unit from the opening unless the end portion of the lock arm is depressed to move the lock arm toward the support surface as the unit is withdrawn to permit the latch shoulder to clear the edge and pass back through the opening.

54. A retaining clip for retaining a unit within an opening through a panel, the unit having a generally rectangular solid casing dimensioned to move through the opening and a face plate held on the casing dimensioned to overlap and engage the panel to stop the unit at the panel opening, the casing having a pair of generally planar support surfaces for supporting a pair of retaining clips in position to respectively engage generally opposing edges of the opening, each clip formed from a single piece of resilient sheet material comprising:

(a) a support portion providing a generally planar surface for resting against one of the support surfaces of the casing;

(b) a mounting portion connected with the support portion and oriented at a generally right angle relative to the support portion, the mounting portion being snugly engaged between the casing and the face plate for holding the clip on the unit;

(c) a pair of generally uniform resilient retaining arms connected with and supported by the support portion, each retaining arm extending from the support portion toward the face plate generally parallel with the other retaining arm and having in sequence a cam surface diverging away from the support surface of the casing for engaging an edge of the opening and a retaining surface sloping back toward the support surface so that during insertion of the unit into the opening the cam surface engages an edge of the opening causing the retaining arm to resiliently yield against the edge and to depress toward the support surface until the retaining surface is moved into engagement with the edge of the opening allowing the retaining arm to move back away from the support surface so that the retaining surface holds the panel against the face plate when the unit is fully inserted; and (d) a separate resilient lock arm connected with the support portion intermediate the retaining arms, the lock arm extending from the support portion toward the face plate generally parallel to the retaining arms, the lock arm having in sequence a camming surface diverging from the support surface for engaging an edge of the opening, a latch shoulder diverging from the camming surface back toward the support surface generally parallel to the panel for abutting the panel at the edge of the opening to latch the unit in position in the panel opening, and a latch release comprising an end portion of the lock arm projecting from the latch shoulder in position to permit depression of the lock arm toward the support surface to release the latch shoulder from the panel so that during insertion of the unit into the opening the camming surface engages an edge of the opening causing the lock arm to depress toward the support surface until the latch shoulder is moved past the edge of the opening causing the lock arm to flex back away from the support surface moving the latch shoulder into position to abut the panel to prevent withdrawal of the unit from the opening unless the end portion of the lock arm is depressed to move the lock arm toward the support surface as the unit is withdrawn to permit the latch shoulder to clear the edge and pass back through the opening.

55. A retaining clip for retaining a unit within an opening through a panel, the unit having a generally rectangular solid casing dimensioned to move through the opening and a face plate held on the casing dimensioned to overlap and engage the panel to stop the unit at the panel opening, the casing having a pair of generally planar support surfaces for supporting a pair of retaining clips in position to respectively engage generally opposing edges of the opening, each clip formed from a single piece of resilient sheet metal comprising:

(a) a support portion providing a generally planar surface for resting against one of the support surfaces of the casing;

(b) a mounting portion connected with the support portion and oriented at a generally right angle relative to the support portion, the mounting portion being snugly engaged between the casing and the face plate for holding the clip on the unit;

(c) at least one generally uniform resilient retaining arm connected with and supported by the support portion, the retaining arm extending from the support portion toward the face plate and having in sequence a cam surface diverging away from the support surface of the casing for engaging and yielding against an edge of the opening and a retaining surface sloping back toward the support surface to hold the panel against the face plate when the unit is fully inserted; and (d) a separate resilient lock arm connected with the support portion proximate the retaining arm, the lock arm extending from the support portion toward the face plate generally parallel to the retaining arm, the lock arm having in sequence a camming surface diverging from the support surface for engaging and yielding against an edge of the opening, a latch shoulder oriented generally parallel to the panel diverging from the camming surface back toward the support surface for abutting the panel at the edge of the opening to latch the unit in position in the panel opening, and a latch release comprising an end portion of the lock arm projecting from the latch shoulder toward the face plate to permit depression of the lock arm toward the support surface to release the latch shoulder from the panel to permit removal of the unit.

* * * * *